United States Patent
Wang et al.

(10) Patent No.: US 12,212,246 B2
(45) Date of Patent: *Jan. 28, 2025

(54) ENERGY DISSIPATION FOR AN ELECTRICAL POWER SUPPLY FOR A TRANSPORT CLIMATE-CONTROL SYSTEM

(71) Applicant: THERMO KING LLC, Minneapolis, MN (US)

(72) Inventors: Xiaorui Wang, Edina, MN (US); Ryan Wayne Schumacher, Bloomington, MN (US)

(73) Assignee: THERMO KING LLC, Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/399,949

(22) Filed: Dec. 29, 2023

(65) Prior Publication Data

US 2024/0136934 A1 Apr. 25, 2024

Related U.S. Application Data

(63) Continuation of application No. 17/491,111, filed on Sep. 30, 2021, now Pat. No. 11,870,356.

(51) Int. Cl.
*H02M 3/335* (2006.01)
*H02M 1/32* (2007.01)
*B60H 1/00* (2006.01)

(52) U.S. Cl.
CPC ......... *H02M 3/33573* (2021.05); *H02M 1/32* (2013.01); *B60H 1/00428* (2013.01)

(58) Field of Classification Search
CPC .. H02M 3/33573; H02M 1/32; B60H 1/00428
See application file for complete search history.

(56) References Cited

U.S. PATENT DOCUMENTS

| | | | |
|---|---|---|---|
| 7,944,161 B2 | 5/2011 | Hiti et al. | |
| 9,893,633 B1 | 2/2018 | Li et al. | |
| 11,870,356 B2 * | 1/2024 | Wang | B60L 1/02 |
| 2016/0172877 A1 | 6/2016 | Xue et al. | |
| 2017/0282714 A1 | 10/2017 | Schumacher et al. | |
| 2018/0079315 A1 | 3/2018 | Yang et al. | |
| 2022/0337166 A1 | 10/2022 | Chan et al. | |

FOREIGN PATENT DOCUMENTS

| | | |
|---|---|---|
| CN | 110920440 | 3/2020 |
| DE | 102014105221 | 10/2015 |
| WO | 2021/023460 | 2/2021 |

OTHER PUBLICATIONS

Extended European Search Report, issued in the related European patent application No. 22198673.0, dated Mar. 17, 2023, 12 pages.
Xu et al., "Fixed Duty Cycle Compensation and Magnetizing Current Design for DAB DC-DC Converter with Conventional Trapezoidal Modulation to Achieve Zero Voltage Switching", IEEE 8th International Power Electronics and Motion Control Conference, 2016, 6 pages.

* cited by examiner

*Primary Examiner* — Rafael O De Leon Domenech
(74) *Attorney, Agent, or Firm* — HSML P.C.

(57) ABSTRACT

Technologies for safely lowering a DC link voltage potential include detecting shut down of a system that is powered by the DC link energy storage system and initiating an operating mode to dissipate energy as a form of loss without utilizing an additional resistor, that is, dissipating the DC link internally to the enclosed power module.

19 Claims, 9 Drawing Sheets

ENERGY DISSIPATION FOR AN ELECTRICAL POWER SUPPLY FOR A TRANSPORT CLIMATE-CONTROL SYSTEM

FIELD

The solutions described and recited herein pertain generally to energy dissipation for an electrical power supply utilized by a transport climate control system.

BACKGROUND

A transport climate control system may include, e.g., a transport refrigeration system (TRS) and/or a heating, ventilation and air conditioning (HVAC) system. A TRS may be used generally to control one or more environmental conditions, e.g., temperature, humidity, air quality, etc., within a cargo space of a transport unit, e.g., a truck, a container (such as a container on a flat car, an intermodal container, etc.), a box car, a semi-tractor, a bus, or other similar transport unit). The TRS may maintain one or more environmental conditions of the cargo space for cargo maintenance. In some embodiments, the transport unit may include a HVAC system to control a climate within a passenger space of the vehicle.

SUMMARY

The solutions described and recited herein pertain generally to energy dissipation for an electrical power supply utilized by a transport climate control system.

The solutions described herein may provide a safe, contained and controlled way to dissipate energy below a threshold level (e.g., 60 VDC). By using a DC/DC converter, the energy may be dissipated as a switching loss while allowing a minimum amount of real power to the load side.

The solutions described and recited herein may prevent the need for additional components (e.g., a bleeding resistor for dissipating residual energy and burning it as heat) and control circuitry for the additional components. Also, the solutions described herein may prevent an uncontrolled discharge time that may occur when using passive discharge (e.g., a bleeding resistor). The solutions may also prevent user exposure to potentially hazardous voltage when, for example, a chopper circuit with a heater is used to provide energy dissipation. Further, the solutions described and recited herein are active solutions by which energy is actively dissipated when needed or required, as opposed to passive discharge by which resistance values are lowered thus resulting in an increase in static power dissipation.

In accordance with at least one example described and/or recited herein, a method to dissipate excess energy from a DC link energy storage system may include detecting shut down of a system that is powered by the DC link energy storage system and initiating an operating mode to dissipate energy. Such energy dissipation is implemented at a rate that is faster than when using only a passive discharge.

In accordance with at least one other example described and/or recited herein, a method to dissipate energy from a DC link energy storage system having a dual-active bridge (DAB) topology may include detecting shut down of a system that is powered by the DC link energy storage system; controlling a phase shift between a source-side bridge and a load-side bridge to be zero (0) or one (1); discharging current from the source-side bridge across a transformer to the load-side bridge; and controlling switching on the load-side bridge to circulate current to minimize current flowing to a load.

In accordance with at least one example described and/or recited herein, a DC/DC converter may include a source-side bridge, a transformer, and a load-side bridge. The DC/DC converter may have a dual-active bridge (DAB) topology. Upon shut down of a system powered by the DC/DC converter, energy from a source may be dissipated by controlling a phase shift between the source-side bridge and the load-side bridge to be zero (0) or one (1), discharging current from the source-side bridge across the transformer to the load-side bridge, and controlling switching on the load-side bridge to circulate current to prevent current from flowing to a load.

DRAWINGS

Reference may be made to the accompanying drawings that form a part of this disclosure and which illustrate embodiments described in this specification. Various changes and modifications will become apparent to those skilled in the art from the following detailed description. The use of the same reference numbers in different figures indicates similar or identical items.

DETAILED DESCRIPTION

The solutions described and recited herein pertain generally to energy dissipation for an electrical power supply utilized by a transport climate control system.

In particular, the technologies described and recited herein pertain to lowering a DC link voltage potential internally to an enclosed power module, to a level below a hazardous threshold level. That is, the embodiments described and recited herein pertain to enclosed circuits in which class A voltage is utilized. Thus, in compliance with ISO DIS 6469-3 (International Organization of Standards) (Safety Specifications for Electrically Propelled Road Vehicles), live parts are to be placed inside an enclosure or behind barriers to prevent access to the live parts from any unusual direction of access. The enclosure or barriers may provide sufficient mechanical resistance under normal operation conditions and, if directly accessible, may be opened or removed only by use of tools or keys.

In accordance with non-limiting examples, the technologies described and recited herein may pertain to safely lowering DC link voltage potential internally to less than, e.g., 60V DC for a class A voltage class battery or less than 1000 V DC for a class B voltage class battery. Voltage classes, in accordance with the embodiments described and recited herein, may pertain to safety specification standards for electrically propelled road vehicles provided by ISO DIS 6469-3.

As set forth in ISO, with regard to a working voltage U, voltage class A has a maximum DC working voltage of: $0 < U \leq 60$ V and a maximum AC working voltage $0 < U \leq 30$ V(rms value); voltage class B has a maximum DC working voltage of $60 < U \leq 1500$ V and a maximum AC working voltage $30 < U \leq 1000$ V(rms value).

Regardless, as a hazardous potential value may vary depending upon voltage class, the embodiments described and recited herein are directed towards safely lowering internal potential to below a respective hazardous level.

The present description and recitation may include the following terms:

"Active filter" may refer to a type of analog circuit implementing an electronic filter using active components.

"Passive component" may refer to either a component that consumes but does not produce energy (thermodynamic passivity) or a component that is incapable of power gain (incremental passivity).

"Active component" may refer to a component that is not a passive component.

"Switch" may refer to a switch, a Metal-Oxide-Semiconductor Field-Effect Transistor (MOSFET), an Insulated Gate Bipolar Transistor (IGBT), or a Bipolar Junction Transistor (BJT), or the like.

Embodiments described and/or recited herein may refer to the accompanying drawings; however, such embodiments are non-limiting examples that may be embodied in various other forms, as well. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art how to variously utilize the present disclosure in any appropriately detailed structure. In this description, as well as in the drawings, similarly-referenced numbers represent elements that may perform the same, similar, or equivalent functions.

The scope of the disclosure should be determined by the appended claims and their legal equivalents, rather than by the examples given herein. For example, the operations or functions recited in any method claims may be executed in any order and not be limited to the sequence presented in the claims. Moreover, no element is essential to the practice of the disclosure unless specifically described herein as "critical" or "essential."

Figure 1A:
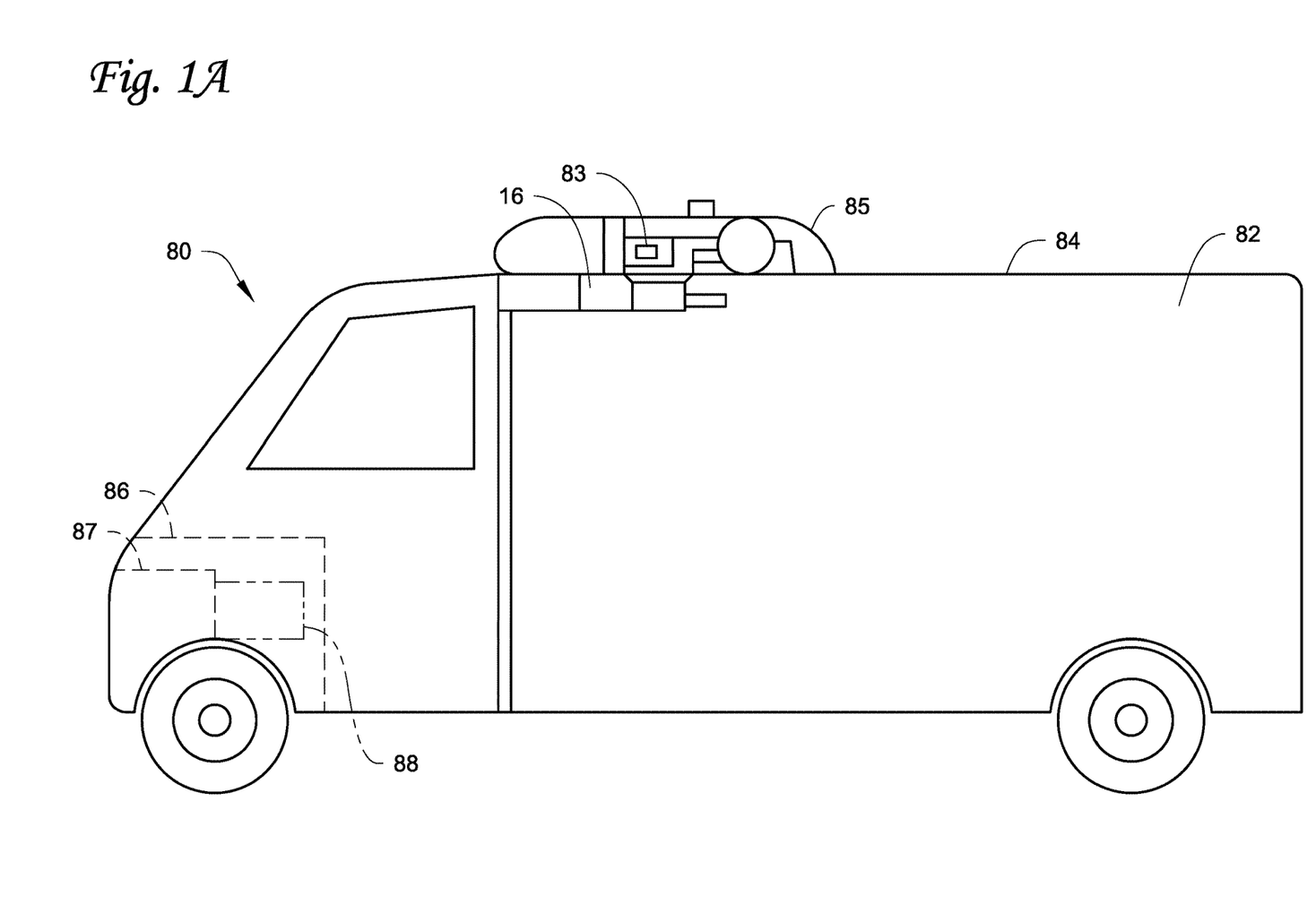
FIG. 1A illustrates a side view of a van with a roof mounted vehicle powered transport climate control unit, in accordance with one or more embodiments described and/or recited herein.

FIG. 1A illustrates a side view of a van with a roof mounted vehicle powered transport climate control unit, in accordance with one or more embodiments described and/or recited herein.

FIG. 1A depicts a temperature-controlled van 80 that includes a transport climate control system for providing climate control to a conditioned load space 82 (or internal space) for carrying cargo. The transport climate control system includes a transport climate control unit (TCCU) 85 that may be mounted to rooftop 84 of load space 82. TCCU 85 may be controlled via controller 83 to provide climate control within load space 82. Van 80 may further include vehicle power bay 86, which houses prime mover 87, such as a combustion engine (e.g., diesel engine, etc.), that provides power to move van 80 and to operate TCCU 85. In some embodiments, prime mover 87 may operate in combination with optional machine 88, e.g., a generator, to operate TCCU 85. In accordance with at least one embodiment described and/or recited herein, TCCU 85 may include its own electric and/or hybrid power system that includes, for example, a battery power source and possibly a prime mover. Also, in accordance with some embodiments, van 80 may be a hybrid vehicle that is powered by prime mover 87 in combination with a battery power source or may be an electrically driven vehicle in which prime mover 87 is replaced by an electric power source, e.g., a battery power source. A multipurpose power converter system may be configured to provide AC power to a load, e.g., compressor, fan/blower, motor, inverter circuit, etc., of TCCU 85. In at least one example embodiment, the multipurpose power converter system may be located within, e.g., TCCU 85. In at least one other embodiment, the multipurpose power converter system may be in a bay area outside of TCCU 85.

Figure 1B:
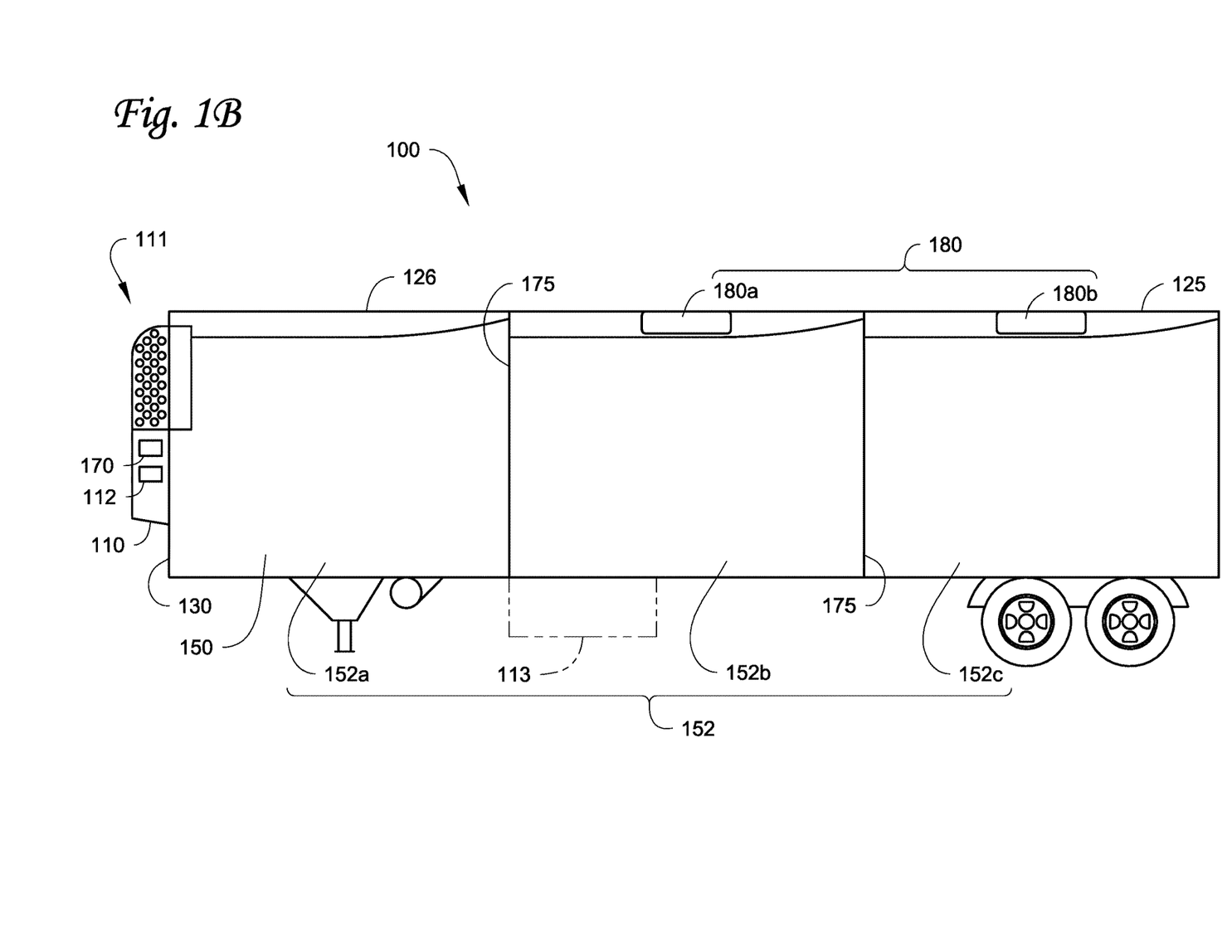
FIG. 1B illustrates a schematic cross sectional side view of a climate controlled transport unit with a multi-temp transport climate control system, in accordance with one or more embodiments described and/or recited herein.

FIG. 1B illustrates a schematic cross sectional side view of a climate controlled transport unit with a multi-temp transport climate control system, in accordance with one or more embodiments described and/or recited herein.

FIG. 1B illustrates a non-limiting embodiment of a multi-zone transport climate control system (MTCS) 100 for TU 125 that may be towed, for example, by a tractor (not shown). MTCS 100 may include TCCU 110 that provides environmental control, e.g. temperature, humidity, air quality, etc., within internal space 150 of TU 125. MTCS 100 also includes a MTCS controller 170 and one or more sensors, e.g., Hall effect sensors, current transducers, etc., that may be configured to measure one or more parameters, e.g., ambient temperature, compressor suction pressure, compressor discharge pressure, supply air temperature, return air temperature, humidity, etc., of MTCS 100 and communicate parameter data to MTCS controller 170. MTCS 100 is powered by power module 112. TCCU 110 may be disposed on a front wall 130 of TU 125. In other example embodiments, TCCU 110 may be disposed, e.g., on a rooftop 126 or another wall of TU 125.

In accordance with at least some non-limiting embodiments described and recited herein, MTCS 100 may include an undermount unit 113, which may be a TCCU that also provides environmental control, e.g., temperature, humidity, air quality, etc., within internal space 150 of TU 125. Undermount unit 113 may work in combination with TCCU 110 to provide redundancy or replace TCCU 110. Also, in some embodiments, undermount unit 113 may be a power module that includes, for example, a generator to power, at least in part, TCCU 110.

Programmable MTCS Controller 170 may include a single integrated control unit or may include a distributed network of TRS control elements. The number of distributed control elements in a given network may depend upon the particular application of the principles described herein. MTCS controller 170 may be configured to control operation of MTCS 100.

As shown in FIG. 1B, power module 112 is disposed in the TCCU 110, although in alternative embodiments, power module 112 may be separate from the TCCU 110. Also, in some embodiments, power module 112 may include two or more different power sources disposed within or outside of TCCU 110. In some embodiments, power module 112 may include one or more of a prime mover, a battery, a generator, a generator, a solar panel, a fuel cell, etc. Also, the prime mover may be a combustion engine or a microturbine engine and may operate as a two speed prime mover, a variable speed prime mover, etc. Power module 112 may provide power to, for example, MTCS Controller 170, a compressor (not shown), a plurality of DC (Direct Current) components (not shown), a power management unit (not shown), etc. The DC components may be accessories or components of MTCS 100 that require DC power to operate. Examples of the DC components may include, for example, DC fan motor(s) for a condenser fan or an evaporator blower, e.g., an Electrically Commutated Motor (ECM), a Brushless DC Motor (BLDC), etc., a fuel pump, a drain tube heater, solenoid valves, e.g., controller pulsed control valves, etc.

Power module 112 may include a DC power source (not shown) for providing DC electrical power to the plurality of DC components (not shown), the power management unit (not shown), etc. The DC power source may receive mechanical and/or electrical power from, for example, a utility power source, e.g., utility power, shore power, grid power, etc., a prime mover, e.g., a combustion engine such as a diesel engine, etc., coupled with a generator machine, e.g., a belt-driven alternator, a direct drive generator, etc. For example, in some embodiments, mechanical energy generated by a diesel engine may be converted into electrical energy via a generator. Electrical energy generated via a belt driven alternator may then be converted into DC electrical power via, for example, a bi-directional voltage converter. The bi-directional voltage converter may be a bi-directional multi-battery voltage converter.

The internal space 150 may be divided into a plurality of zones 152*a-c*. The term "zone" may refer to a part of an area of the internal space 150 separated by walls 175. The embodiments described and recited herein may also be used in a single zone TRS.

MTCS 100 for TU 125 may include TCCU 110 and a plurality of remote evaporator units 180. In some embodiments, an HVAC system may be powered by an Auxiliary Power Unit (APU, see FIG. 1C), which may operate when a main prime mover providing power to MTCS 100 is turned off, e.g., when a driver parks TU 125 for an extended period of time to rest. The APU may, e.g., provide power to operate a secondary HVAC system to provide conditioned air to a cabin of TU 125. The APU may also provide power to operate cabin accessories within the cabin such as a television, a microwave, a coffee maker, a refrigerator, etc. The APU may be a mechanically driven APU, e.g., prime mover driven, or an electrically driven APU, e.g., battery driven.

A tractor towing TU 125 may include a vehicle electrical system for supplying electrical power to the electrical loads of the tractor, MTCS 100, and/or components, e.g., lights, door sensors, gate lifts, etc., of TU 125. A multipurpose power converter system may be configured to provide AC power to a load, e.g., compressor, fan/blower, motor, inverter circuit, etc., of MTCS 100. In at least one example embodiment, the multipurpose power converter system may be located within, for example, TCU 111. Alternatively, the multipurpose power converter system may be in a bay area outside of TCU 111.

Figure 1C:
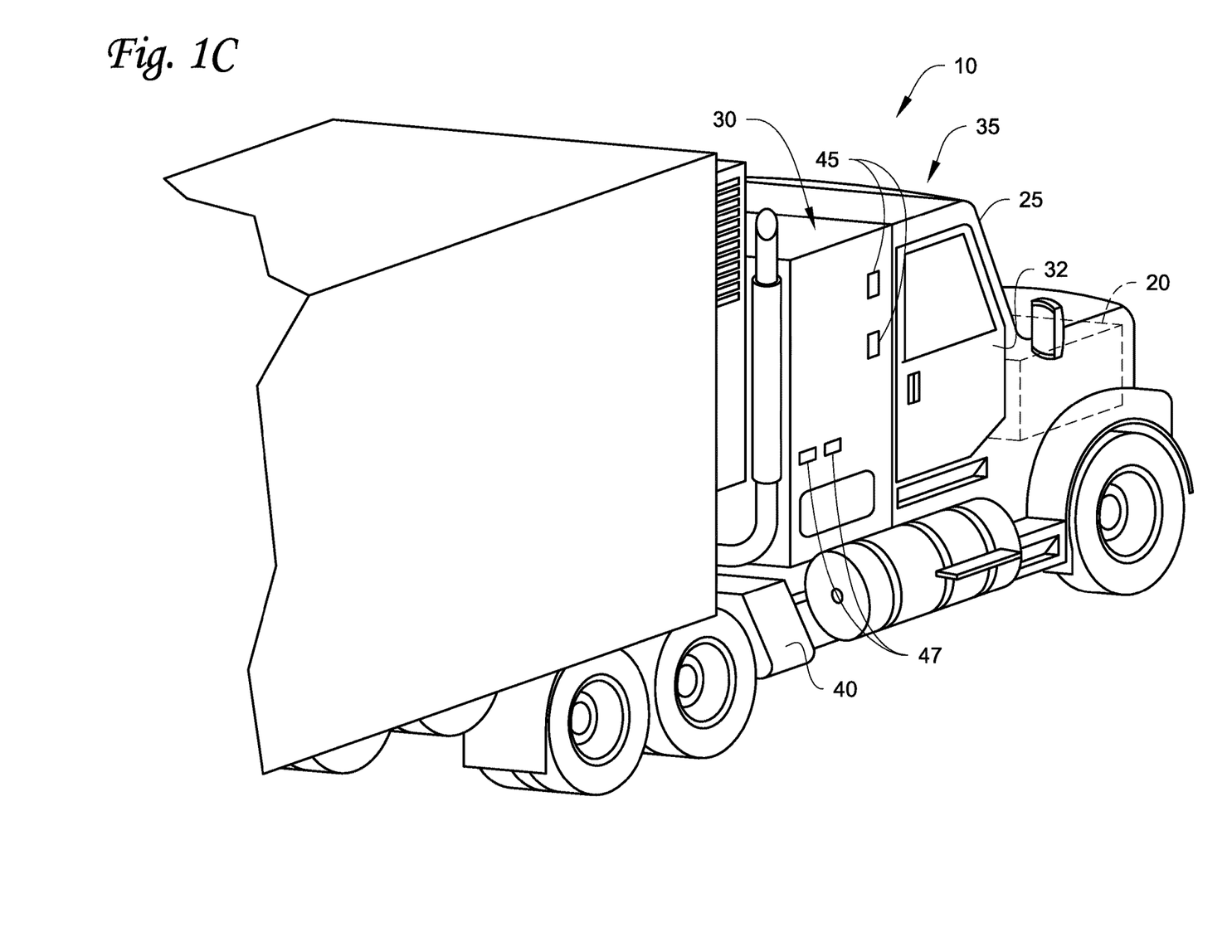
FIG. 1C illustrates a perspective view of a vehicle, in accordance with one or more embodiments described and/or recited herein.

FIG. 1C illustrates a perspective view of a vehicle, in accordance with one or more embodiments described and/or recited herein.

Vehicle 10 may be, e.g., a semi-tractor that may be used to transport cargo stored in a transport unit, e.g., a container, a trailer, etc. Herein, the term "vehicle" shall be used to represent all such tractors and trucks, and shall not be construed to limit the present application solely to a tractor in a tractor-trailer combination. Thus, in some embodiments, vehicle 10 may be, e.g., a straight truck, van, etc.

Vehicle 10 may include primary power source 20, cabin 25 defining sleeping portion 30 and driving portion 35, APU 40, and plural vehicle accessory components 45, e.g., electronic communication devices, cabin lights, a primary and/or secondary HVAC system, primary and/or secondary HVAC fan(s), sunshade(s) for a window/windshield of the vehicle 10, cabin accessories, etc. Cabin 25 may include a primary HVAC system (not shown) that may be configured to provide conditioned air within driving portion 35 and potentially the entire cabin 25, and a secondary HVAC system (not shown) for providing conditioned air within the sleeping portion 30 of cabin 25. Cabin 25 may also include a plurality of cabin accessories, e.g., for example, a refrigerator, a television, a video game console, a microwave, device charging station(s), a continuous positive airway pressure (CPAP) machine, a coffee maker, a secondary HVAC system for providing conditioned air to sleeping portion 30, etc.

Primary power source 20 may provide sufficient power to operate vehicle 10 and any of vehicle accessory components 45 and cabin accessory components 47. Primary power source 20 may also provide power to the primary HVAC system and the secondary HVAC system. In accordance with at least some embodiments, the primary power source may be a prime mover such as, for example, a combustion engine, e.g., a diesel engine, etc.

APU 40 may be a secondary power unit for vehicle 10 when primary power source 20 is unavailable. Accordingly, APU 40 may be configured to provide power to one or more of the vehicle accessory components, the cabin accessories, the primary HVAC system and the secondary HVAC system. APU 40 may be an electric powered APU, though for other embodiments, APU 40 may be a prime mover powered APU. APU 40 may be attached to vehicle 10 using any attachment method. In some embodiments, APU 40 may be turned on, i.e., activated, or off, i.e., deactivated, by an occupant, e.g., driver or passenger, of vehicle 10. APU 40 generally does not provide sufficient power for operating, e.g., driving, vehicle 10. APU 40 may be controlled by an APU controller 41. A multipurpose power converter system may be configured to provide AC power to a load, e.g., compressor, fan/blower, motor, inverter circuit, etc., of the vehicle 10. In an embodiment, the multipurpose power converter system may be located within, for example, the semi-tractor.

Figure 1D:
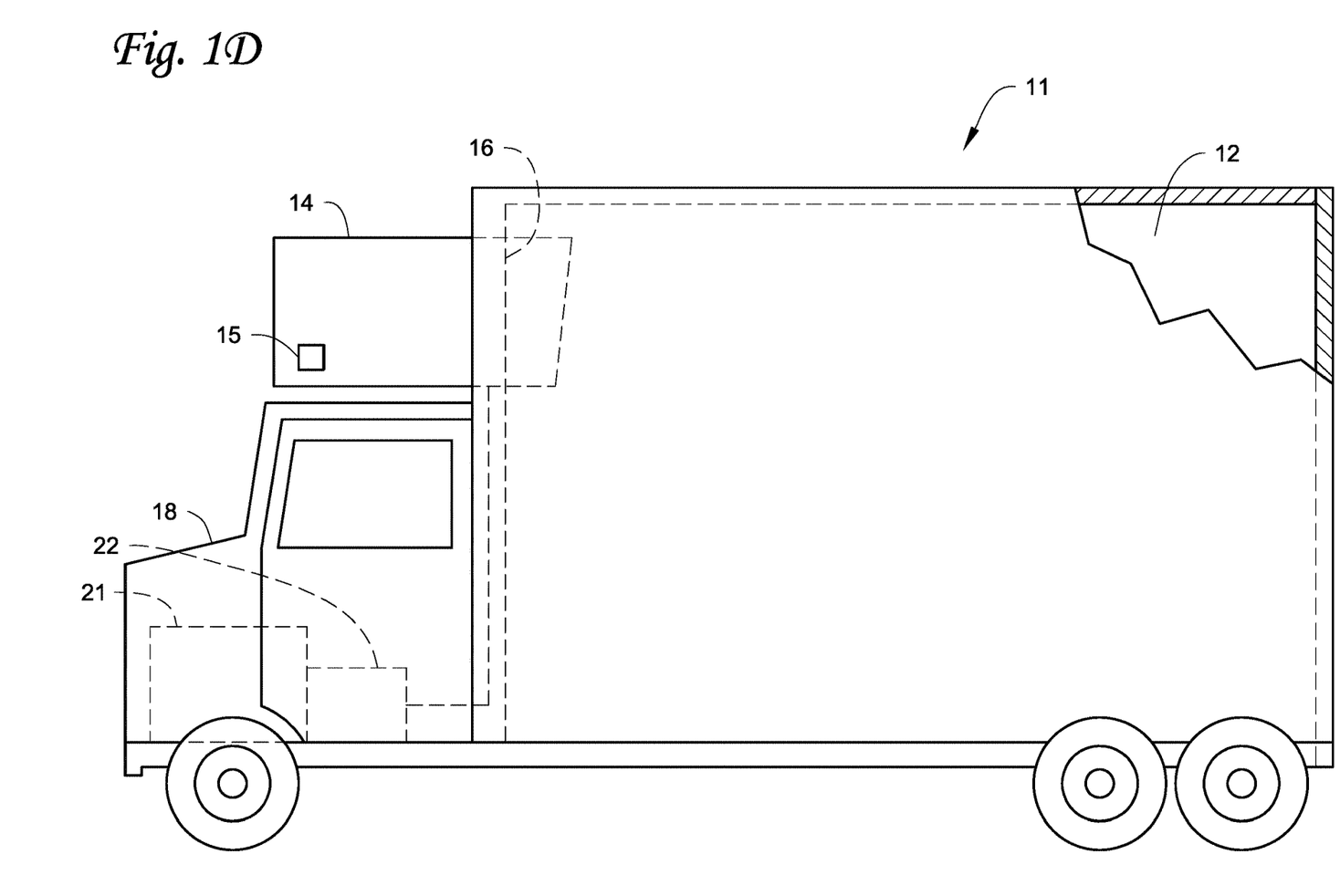
FIG. 1D illustrates a side view of a truck with a front wall mounted vehicle powered transport climate control unit, in accordance with one or more embodiments described and/or recited herein.

FIG. 1D illustrates a side view of a truck with a front wall mounted vehicle powered transport climate control unit, in accordance with one or more embodiments described and/or recited herein.

FIG. 1D depicts a temperature-controlled straight truck 11 that includes a transport climate control system that provides climate control to a conditioned load space 12 for carrying cargo. The transport climate control system includes a transport climate control unit (TCCU) 14 that may be mounted to a front wall 16 of load space 12. TCCU 14 may be controlled via controller 15 to provide climate control within load space 12. The truck 11 may further include vehicle power bay 18, which houses prime mover 21, such as a combustion engine, e.g., diesel engine, etc., that provides power to move the truck 11 and to operate TCCU 14. In some embodiments, prime mover 21 may work in combination with an optional machine 22, e.g., a generator, to operate TCCU 14. In one embodiment, TCCU 14 may include its own electric and/or hybrid power system that includes, for example, a battery power source and possibly a prime mover. Also, in some embodiments, truck 11 may be a hybrid vehicle that is powered by prime mover 21 in combination with a battery power source or may be an electrically driven truck in which prime mover 21 is replaced with an electric power source, e.g., a battery power source.

The embodiments described and recited herein may also apply to any other type of transport unit including, but not limited to, a container, e.g., a container on a flat car, an intermodal container, etc., a box car, or other similar transport unit. A multipurpose power converter system may be configured to provide AC power to a load, e.g., compressor, fan/blower, motor, inverter circuit, etc., of TCCU 14. In at least one embodiment, the multipurpose power converter system may be located, e.g., within TCCU 14. In another embodiment, the multipurpose power converter system may be in a bay area outside of TCCU 14.

Figure 2:
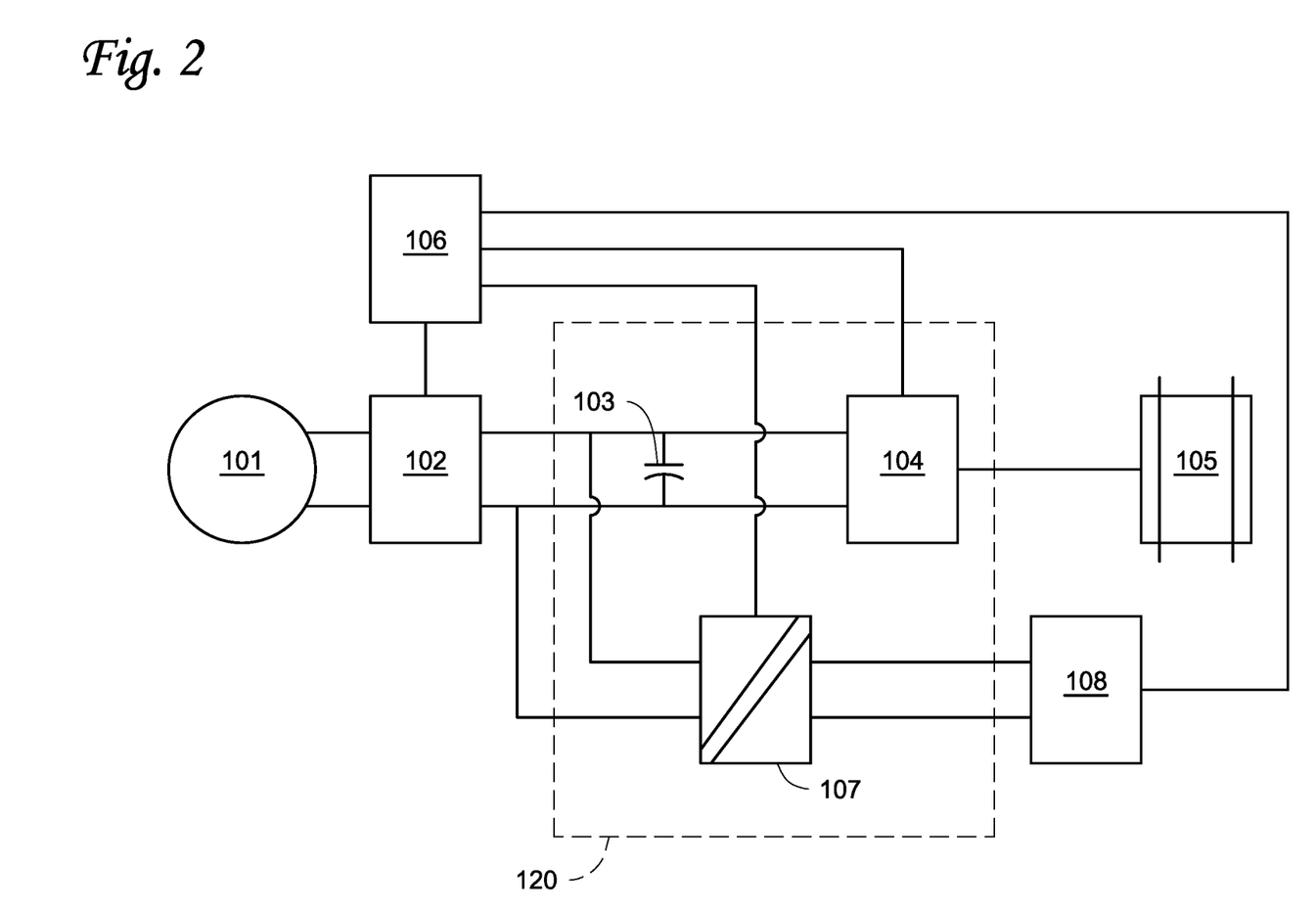
FIG. 2 is a schematic illustration of multipurpose power converter control system for a transport climate control system, according to at least one non-limiting example embodiment described and recited herein.

FIG. 2 is a schematic illustration of multipurpose power converter control system 200 for a transport climate control system, according to at least one non-limiting example embodiment described and recited herein. The transport climate control system may include, for example, the transport climate control systems shown in and described with reference to FIGS. 1A-1D. Control system 200 includes power source 101 with switch or mechanical relay 102 connected thereto; power converter 104; load 105; controller 106. In accordance with at least one example embodiment, DC-link energy storage 103 may be separated from power source 101 by solid state switch or mechanical relay 102.

Enclosure 120 may refer to physical enclosure in which electrically conductive, i.e, live, components are to be placed to prevent inadvertent access thereto. Enclosure 120 or barriers may provide sufficient mechanical resistance under normal operation conditions and, if directly accessible, may be opened or removed only by use of tools or keys. In accordance with the embodiments described and recited herein, enclosure 120 may house or bound hazardous voltage power coming from a DC link to hazardous voltage load and, in parallel, a DCDC Converter going to low voltage DC loads. Thus, power converters may be housed or bounded within enclosure 120, though loads are not.

Therefore, in accordance with the embodiments described and recited herein, it is the hazardous voltage levels coming from the DC link that is dissipated. Hazardous voltage levels corresponding to, e.g., power source 101 or other sources that are external to enclosure 120 may be dissipated by other means that are unrelated to those described and recited herein. Accordingly, as set forth above, DC-link energy storage 103 may be separated from power source 101 by solid state switch or mechanical relay 102.

Controller 106 may be configured to control solid state switch or mechanical relay 102 based on the power source 101 (e.g., single-phase or three-phase AC power). In accordance with at least one example embodiment, controller 106 may receive data from a plurality of sensors that monitor a plurality of parameters such as, an output AC voltage/current/frequency/phases/power from the power source 101, an output AC voltage/current/frequency of converter 104, switching frequency of switch or relay 102, an output DC voltage of HVDC/LVDC converter 107, etc.

Power source 101 may be any one of a utility power source, a vehicle mounted generator, an offboard generator, etc. Further, power source 101 may be an engine driven generator, a genset (offboard generator), single phase utility power, and/or three-phase utility power. In accordance with at least one example embodiment, power source 101 may be a single-phase AC utility power source or a three-phase AC utility power source to provide an input AC voltage to components within enclosure 120.

Solid state switch or mechanical relay 102 may be configured to regulate passage of voltage from DC power source 101 to the DC-link energy storage, e.g., capacitor 103. However, in accordance with alternative embodiments, if power source 101 is an AC power source, box 102 shown in FIG. 2 may be provided as an AC/DC converter to pass voltage to DC-link energy storage, e.g., capacitor 103.

Internal DC-link energy storage, e.g., capacitor 103 may be configured to store power obtained from power source 101, via switch or relay 102. In accordance with one or more non-limiting example embodiments described and recited herein, DC-link energy storage 103 may store hazardous amounts of power that are to be isolated or drained, i.e., dissipated.

DC-link energy storage, e.g., capacitor 103 may store power obtained from power source 101, via switch or relay 102, while power is being provided to AC load power converter 104 and AC load 105, as well as to, in parallel, high-voltage DC/low-voltage DC converter 107 and DC load 108. Accordingly, is operation mode, DC-link energy storage 103 may be at a hazardous voltage level, and when operation ceases, energy stored on DC-link energy storage 103 should be dissipated therefrom Failure to do so results in DC-link energy storage 103 retaining the hazardous level of voltage potential.

Figure 3:
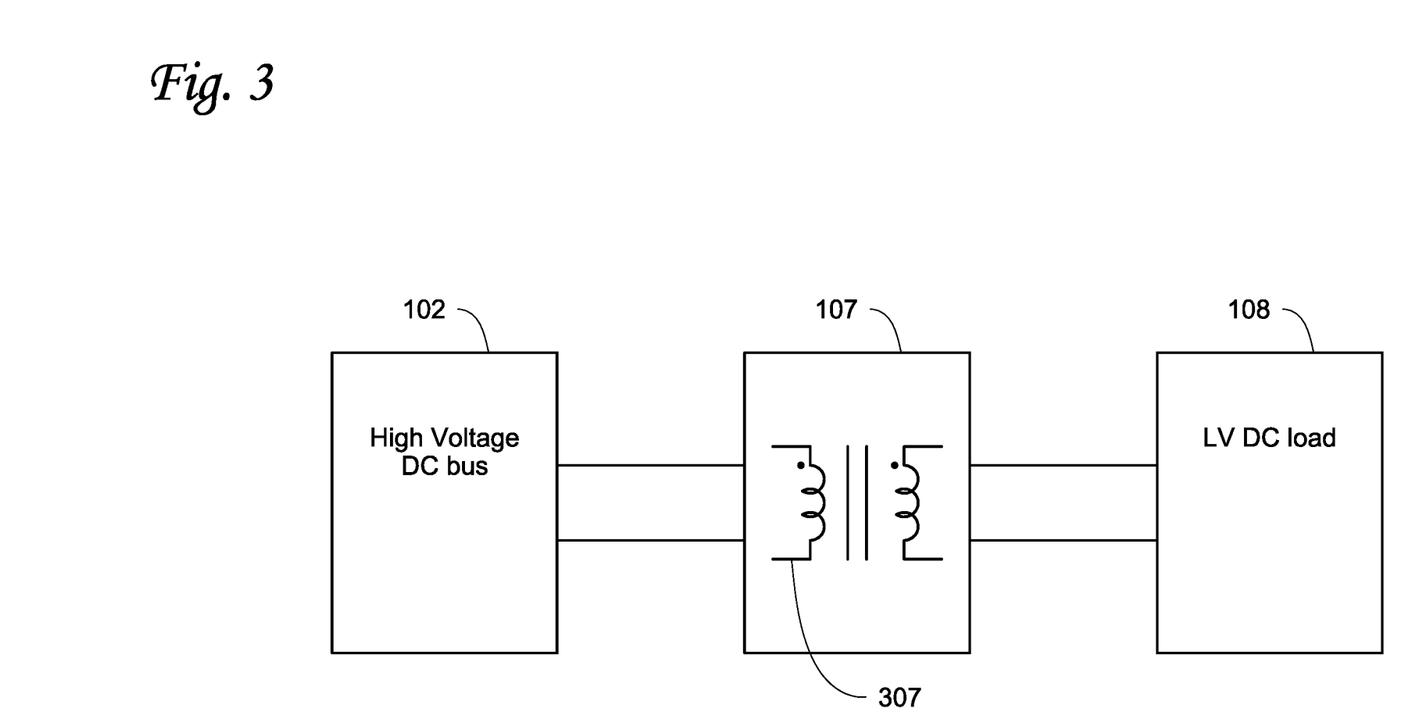
FIG. 3 is a schematic illustration of a DC/DC converter, in accordance with one or more embodiments described and/or recited herein.

FIG. 3 is a schematic illustration of a DC/DC converter, in accordance with one or more embodiments described and/or recited herein.

Accordingly, in line with the example embodiments recited, described, and illustrated with reference to FIGS. 1A-1D and FIG. 2, FIG. 3 illustrates DC/DC converter 107, which dissipates, i.e., discharges, residual energy from DC-link energy storage, e.g., capacitor 103.

In accordance with the embodiments described and recited, or even suggested, herein, DC/DC converter 107 may dissipate energy from DC link energy storage 103 without additional components, nor is additional physical volume needed for that purpose. That is, whereas previously known discharge circuits may utilize a bleeding resistor to dissipate residual energy that may burned as heat, the presently described and recited embodiments facilitate active discharge of residual energy without generating potential hazardous voltage on any external circuits or components.

DC/DC converter 107 may generate low voltage for DC load 108, e.g., a fan, upon receiving a high voltage from, e.g., power source 101, via switch or relay 102. Further, as an example of the hazardous conditions proactively avoided, i.e., pre-empted by the present embodiments, if $C_{bus}$ is 120 uF and $V_{bus}$ is 400V, energy on the DC link may be approximately 10 Joules. An energy level that exceeds 10 Joules may be considered to be hazardous, and an energy level of approximately 50 Joules may be considered to be lethal to a person exposed thereto. As set forth in ISO DIS 6469-3, a voltage class B electric circuit may be de-energized as a protective measure. Monitoring of faults within a circuit or the detection of particular events may trigger the de-energization. For a de-energized circuit, voltage is to be reduced to less than 30 V(rms) for AC circuits and 60 V for DC circuits, and total energy stored is to be below 0.2 J.

Therefore, the present non-limiting embodiments facilitate energy discharge that safely lowers DC link voltage potential, thus proactively avoiding an electric shock hazard. In operation mode, the DC link of the system has high voltage potential; therefore, when the system is to shut down, energy stored on the DC link needs to a path to dissipate. Without such dissipation, the remnant high voltage potential on the DC link presents a shock hazard.

Figure 4:
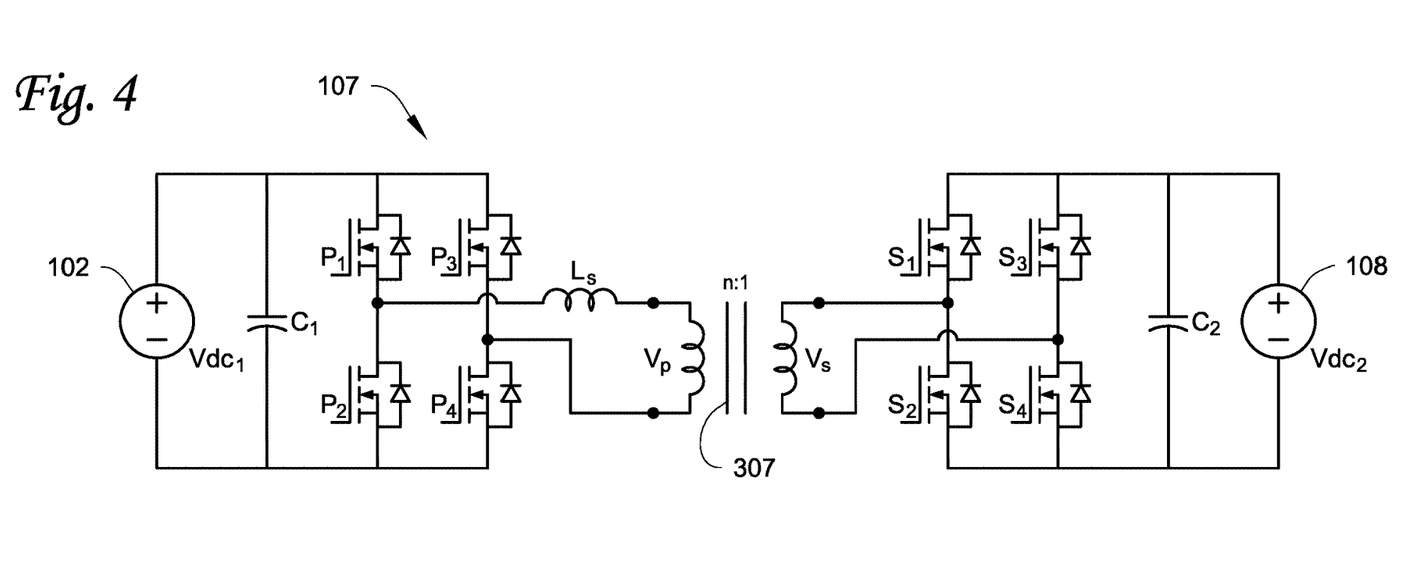
FIG. 4 is a schematic illustration of a DC/DC converter having a dual-active bridge topology, in accordance with one or more embodiments described and/or recited herein.

FIG. 4 is a schematic illustration of DC/DC converter 107, further to the example of FIG. 3, having a dual-active bridge topology, in accordance with one or more embodiments described and/or recited herein.

Accordingly, as with FIG. 3, in accordance with the example embodiments recited, described, and illustrated with reference to FIGS. 1A-1D and FIG. 2, FIG. 3 illustrates DC/DC converter 105, which dissipates, i.e., discharges, residual energy from DC-link energy storage, e.g., capacitor 103.

In accordance with at least some of the embodiments described and recited, or even suggested, herein, excess energy may be dissipated from DC link energy storage 103 by detecting shut down of a system that is powered by the DC link energy storage 103, and initiating an operating mode to dissipate energy as a form of loss, i.e., reduction in DC link voltage, at a greater rate than when utilizing just a passive discharge resistor. Included in the dissipation of energy, according to embodiments of the aforementioned enclosure, operation of DC/DC converter 107 in a minimal power transfer mode or an inefficient mode dissipates energy; and, further, switching of switches, powering gate drivers corresponding to the switches, and operation of the controller may dissipate energy.

The operating mode may include transferring energy from a source-side of DC/DC converter 107 to a load-side of DC/DC converter 107, and circulating at least portions of the transferred energy on the load-side. Portions of the transferred energy may be dissipated at transformer 307 across which energy may be transferred from the source-side to the load-side.

The aforementioned circulating may include cycling switches on the load-side of DC/DC converter 107 to turn alternately on-and-off in order to circulate transferred energy around a bridge formed by the switches on the load-side, although the switches are never on simultaneously otherwise the excess energy, which may be at hazardous levels, may reach DC low-voltage load 108.

It is the act of operating converter 107 in a minimal power transfer mode or inefficient mode will dissipate energy. Further, the switching of the switches, powering of their gate drivers, operation of the controller also dissipate energy. Such energy dissipation occurs within enclosure 120.

In accordance with other embodiments described and recited, or even suggested, herein, excess energy may be dissipated from DC link energy storage system that has a dual-active bridge (DAB) topology, or other topology having no galvanic connection between a primary and secondary side, with energy being transferred via a magnetic field of an isolation transformer, and active switches on the secondary side of a transformer, by detecting shut down of a system that is powered by the DC link energy storage system, controlling a phase shift between a bridge disposed on a source-side of DC/DC converter 105 and a bridge disposed on a load-side of DC/DC converter 107 to be zero (0) or one (1), or substantially close thereto. Further, in accordance with at least some non-limiting example embodiments, the isolation transformer may have a set transformation or winding ratio so that the secondary side of the transformer has a voltage level that is lower than that on the primary side.

Figure 5:
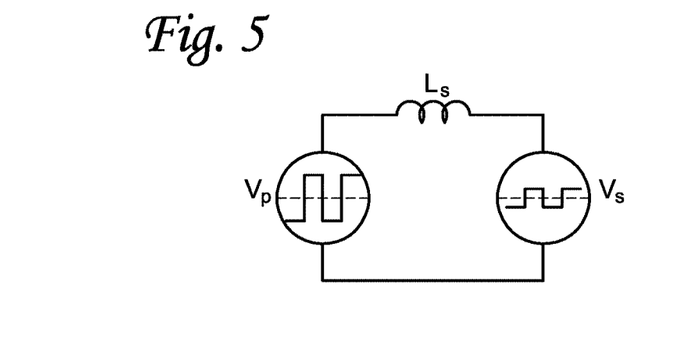
FIG. 5 shows an example of such phase shift, whereby in a DC link energy storage system having a DAB topology, power transfer occurs in the primary and second side of the transformer that create, respectively, high-frequency square waves by MOSFET switching action.

FIG. 5 shows an example of such phase shift, whereby in a DC link energy storage system having a DAB topology, power transfer occurs in the primary and second side of the transformer that create, respectively, high-frequency square waves by MOSFET switching action. With regard to embodiments described and recited herein, the high-frequency square waves are phase-shifted, relative to each other. Thus, the DAB topology facilitates transfer of energy by controlling the phase shift between the primary bridge and the secondary bridge.

Energy flow from the primary side of the transformer to the secondary side of the transformer may be modeled as:

$$P = \frac{nV_{dc1}V_{dc2}D(1-D)}{2f_sL_s} \quad \text{(formula 1)}$$

fs is the switching frequency of the switches in the circuits;
Ls is the inductance;
D is the phase shift between the primary bridge and secondary bridge; and
n is the turns ratio of the transformer.

Thus, current from the source-side bridge may be discharged across transformer 307 to the load-side bridge, which may include, e.g., control and drive electronics, and switching on the load-side bridge may be controlled to circulate current to prevent current from flowing to load 310.

Figure 6:
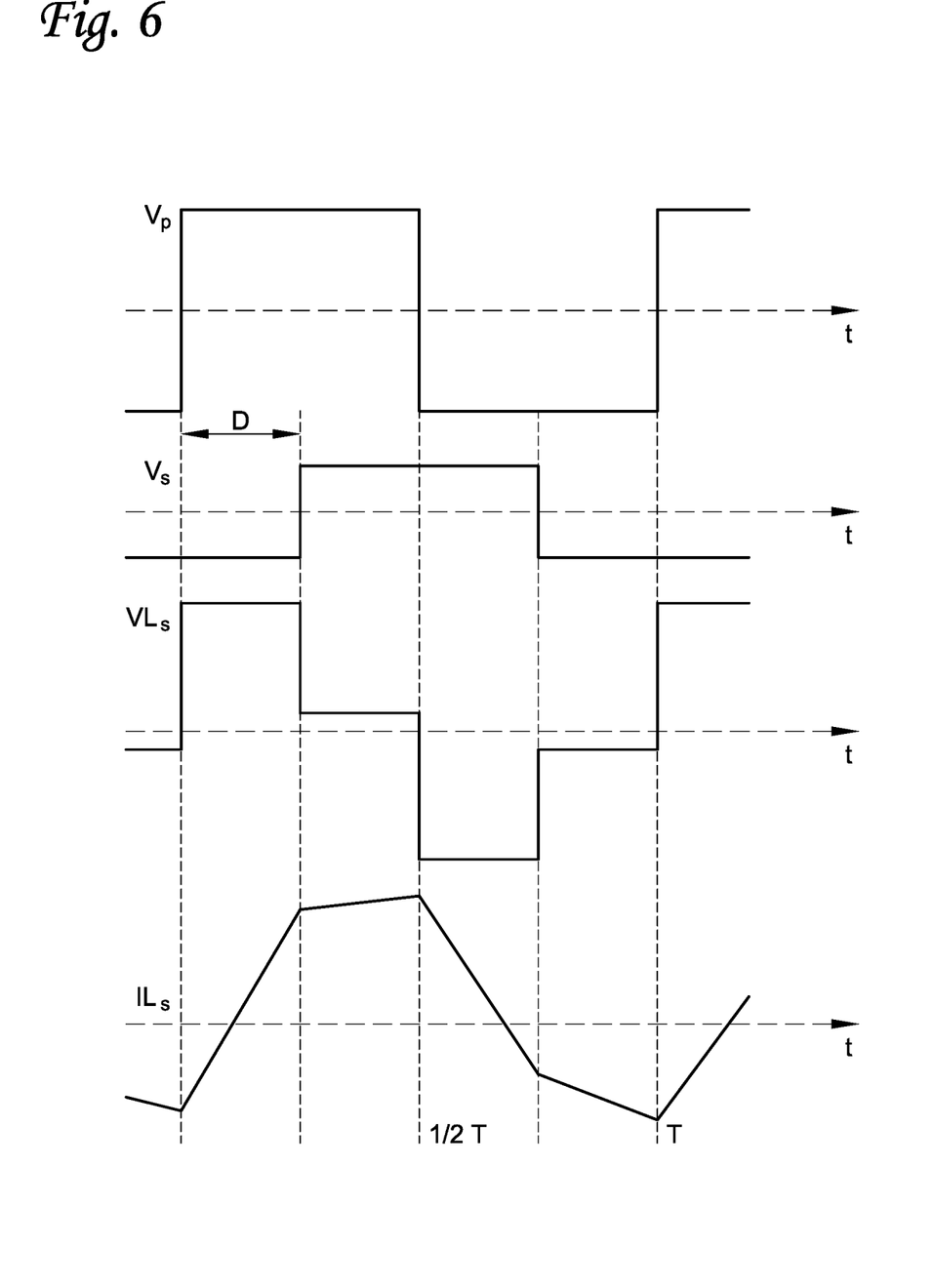
FIG. 6 shows a switching waveform, in accordance with the embodiments implemented herein.

FIG. 6 shows a switching waveform, in accordance with the embodiments implemented herein. By controlling the phase shift D, the amount of energy being transferred may be regulated. During the energy transfer process, some energy may be lost in the form of MOSFET switching loss, transformer core loss and winding loss, which is not detrimental to the dissipation of residual energy. Therefore, to instead effectuate maximum energy loss through the DCDC converter, instead of using an additional branch of resistor and switch for energy dissipation, the DCDC converter loss acts as a virtual bleeding resistor.

Figure 7:
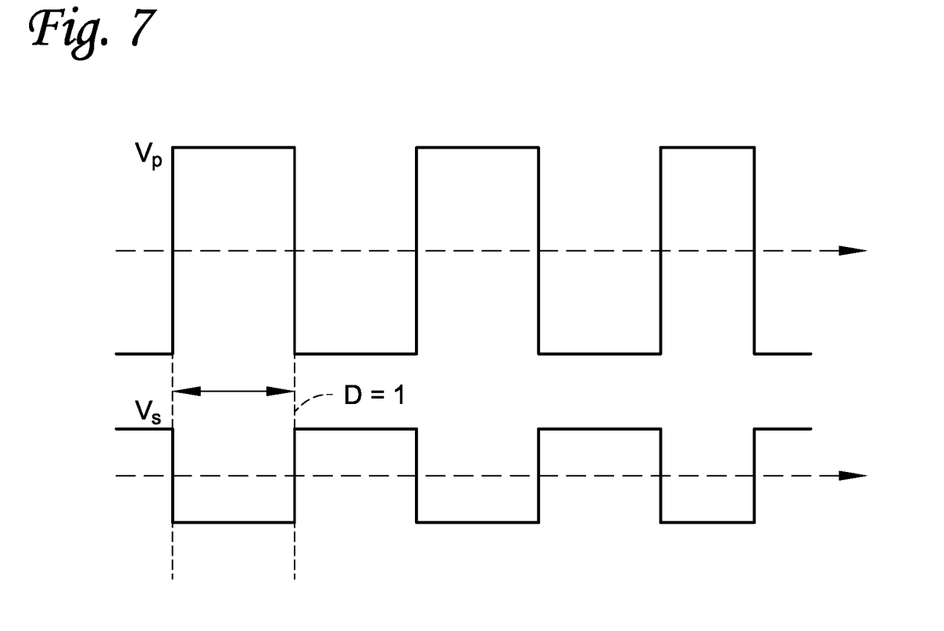
FIG. 7 shows a minimum active energy switching pattern, in accordance with at least one embodiment implemented herein.
Figure 8:
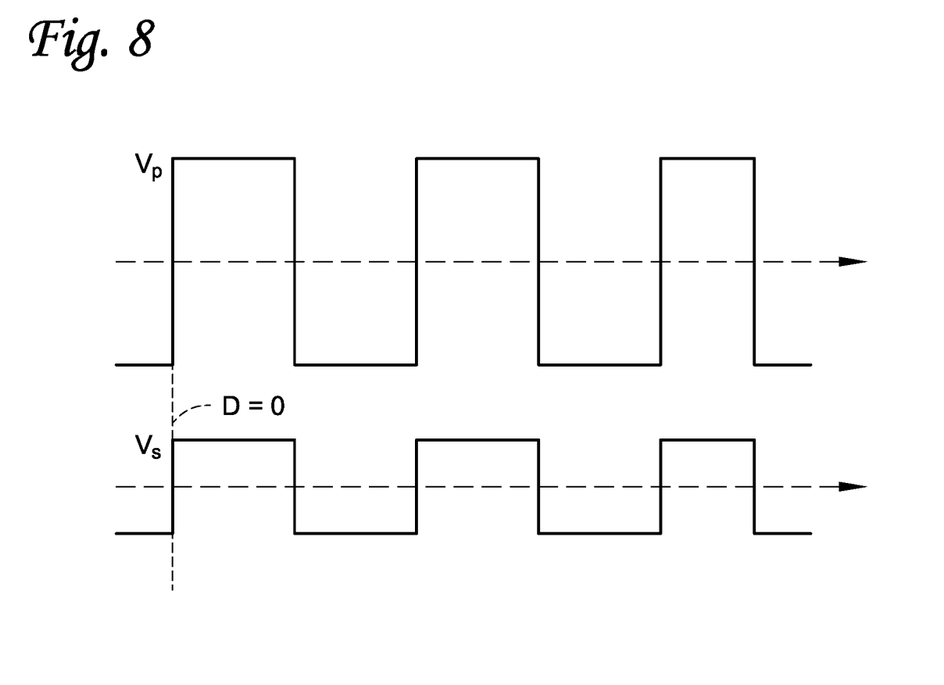
FIG. 8 shows another minimum active energy switching pattern, in accordance with at least one other embodiment implemented herein.

Since maximum energy loss and minimum energy transfer is the goal to avoid a shock hazard, phase shift D may be tuned in order to maximize reactive power that is being transferred while limiting active power transfer. For example, based on formula 1, listed above, minimum energy transfer may be achieved by controlling phase shift D to be 0 or 1, or substantially close thereto. FIG. 7 shows a minimum active energy switching pattern when phase shift D=1; and FIG. 8 shows a minimum active energy switching pattern when phase shift D=0. Thus, the MOSFET and transformer incur a same amount of loss, with only a safe amount of energy being transferred to the load side.

Further still, the aforementioned controlling of switching on the load-side bridge includes cycling switches on the load-side bridge on-and-off to circulate current from switch-to-switch.

As a result of implementation of the embodiments described and recited, or even suggested, herein, current from the source-side of DC/DC converter 105 is prevented from flowing to a load on the load-side of DC/DC converter 105. That is, switching on the active bridge on the load-side of DC/DC converter 105 may be controlled so that the current remains on the active bridge, thus preventing the current from reaching the load at which any current would produce hazardous conditions for a user.

Accordingly, the discharge switching pattern may include:

Controlling the phase shift between two bridges to limit active power transfer. By doing this, the load current circulating inside the system is also low and the soft switching region will get narrower. With less soft switching, the system loss is increased. Hence, it helps discharging the high voltage DC bus.

Increasing the switching frequency to thereby increase the gate switching loss, and directing the gate driver power from the high voltage bus, leading to faster discharge. Further, the MOSFET switching loss increases linearly to the switching frequency.

Based upon the two points mentioned above, the system incurs a more rapid and efficient discharge process.

Different features, variations and multiple different embodiments have been shown and described with various details. What has been described in this application at times in terms of specific embodiments is done for illustrative purposes only and without the intent to limit or suggest that what has been conceived is only one particular embodiment or specific embodiments. It is to be understood that this disclosure is not limited to any single specific embodiments or enumerated variations. Many modifications, variations and other embodiments will come to mind of those skilled in the art, and which are intended to be and are in fact covered by both this disclosure. It is indeed intended that the scope of this disclosure should be determined by a proper legal interpretation and construction of the disclosure, including equivalents, as understood by those of skill in the art relying upon the complete disclosure present at the time of filing.

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "able to operably coupled", to each other to achieve the desired functionality.

As described and recited herein, known communication signals from charging equipment may be exploited to serve as a basis for reducing unit current demand. That is, the control signal from a power source or supply equipment informs unit power draw decisions.

Aspects

It is to be appreciated that any of the following aspects may be combined:

Aspect 1. A method to dissipate excess energy from a DC link battery, comprising:
  detecting shut down of a system that is powered by the DC link energy storage system;
  initiating an operating mode to dissipate energy as a form of loss without utilizing an additional resistor.

Aspect 2. The method of Aspect 1, wherein the operating mode includes:
  transferring energy from a source-side of the DC link energy storage system to a load-side;
  circulating at least portions of the transferred energy on the load-side.

Aspect 3. The method of Aspect 1 or Aspect 2, wherein portions of the transferred energy are dissipated at a transformer across which the energy is transferred from the source-side to the load-side.

Aspect 4. The method of any of Aspects 1-3, wherein the circulating includes cycling switches on the load-side on-and-off to circulate transferred energy around a load-side bridge.

Aspect 5. The method of any of Aspects 1-4, wherein the switches on the load-side are never on simultaneously.

Aspect 6. A method to dissipate energy from a DC link energy storage system having a dual-active bridge (DAB) topology, the method comprising:
  detecting shut down of a system that is powered by the DC link energy storage system;
  controlling a phase shift between a source-side bridge and a load-side bridge to be zero (0) or one (1);
  discharging current from the source-side bridge across a transformer to the load-side bridge; and
  controlling switching on the load-side bridge to circulate current to prevent current from flowing to a load.

Aspect 7. The method of Aspect 6, wherein the source-side bridge is perpendicular to the load-side bridge.

Aspect 8. The method of Aspect 6 or Aspect 7, wherein the controlling of switching on the load-side bridge includes cycling switches on the load-side bridge on-and-off to circulate current from switch-to-switch.

Aspect 9. The method of any of Aspects 6-8, wherein the switches on the load-side bridge are never on simultaneously.

Aspect 10. A DC/DC converter, comprising:
  a source-side bridge;
  a transformer; and
  a load-side bridge,
  wherein the DC/DC converter has a dual-active bridge (DAB) topology, and
  wherein, upon shut down of a system powered by the DC/DC converter, energy from the source-side bridge is dissipated by:
    controlling a phase shift between the source-side bridge and the load-side bridge to be zero (0) or one (1);
    discharging current from the source-side bridge across the transformer to the load-side bridge; and
    controlling switching on the load-side bridge to circulate current to prevent current from flowing to a load.

Aspect 11. The DC/DC converter of Aspect 10, wherein the controlling of switching on the load-side bridge includes cycling switches on the load-side bridge on-and-off to circulate current from switch-to-switch.

Aspect 12. The DC/DC converter of Aspect 10 or Aspect 11, wherein the circulated current does not reach the load.

Aspect 13. The DC/DC converter of any of Aspects 10-12, wherein the switches on the load-side bridge are never on simultaneously.

The terminology used in this specification is intended to describe particular embodiments and is not intended to be limiting. The terms "a," "an," and "the," or even the absence of such modifiers, may refer to the plural forms as well, unless clearly indicated otherwise. The terms "includes," "including," "comprises" and/or "comprising," when used in this specification, indicate the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts, without departing from the scope of the present disclosure. The word "embodiment" as used within this specification may, but does not necessarily, refer to the same embodiment. This specification and the embodiments described are examples only. Other and further embodiments may be devised without departing from the basic scope thereof, with the true scope and spirit of the disclosure being indicated by the claims that follow.

The invention claimed is:

1. A method to dissipate excess energy from a DC link energy storage system, comprising:
   detecting shut down of a system that is powered by the DC link energy storage system; and
   initiating an operating mode to dissipate energy as a form of loss without utilizing an additional resistor, the operating mode includes:
   controlling a phase shift between a source-side bridge and a load-side bridge.

2. The method of claim 1, wherein the operating mode includes:
   transferring energy from a source-side of the DC link energy storage system to a load-side;
   circulating at least portions of the transferred energy on the load-side.

3. The method of claim 2, wherein portions of the transferred energy are dissipated at a transformer across which the energy is transferred from the source-side to the load-side.

4. The method of claim 2, wherein the circulating includes cycling switches on the load-side on-and-off to circulate transferred energy around a load-side bridge.

5. The method of claim 4, wherein the switches on the load-side are never on simultaneously.

6. The method of claim 1, wherein controlling the phase shift between the source-side bridge and the load-side bridge includes controlling to the phase shift to be in phase or out of phase.

7. The method of claim 1,
   wherein the DC link energy storage system has a dual-active bridge (DAB) topology, and
   the controlling includes phase-shifting high-frequency square waves to facilitate transferring of energy.

8. A method to dissipate energy from a DC link energy storage system having a dual-active bridge (DAB) topology, the method comprising:
   detecting shut down of a system that is powered by the DC link energy storage system;
   controlling a phase shift between a source-side bridge and a load-side bridge;
   discharging current from the source-side bridge across a transformer to the load-side bridge; and
   controlling switching on the load-side bridge to circulate current to prevent current from flowing to a load.

9. The method of claim 8, wherein the source-side bridge is perpendicular to the load-side bridge.

10. The method of claim 8, wherein the controlling of switching on the load-side bridge includes cycling switches on the load-side bridge on-and-off to circulate current from switch-to-switch.

11. The method of claim 10, wherein the switches on the load-side bridge are never on simultaneously.

12. The method of claim 8, wherein controlling the phase shift between the source-side bridge and the load-side bridge includes controlling the phase shift to be in phase or out of phase.

13. The method of claim 8, wherein the controlling of the phase shift includes phase-shifting high-frequency square waves to facilitate a transfer of energy.

14. A DC/DC converter, comprising:
   a source-side bridge;
   a transformer; and
   a load-side bridge,
       wherein the DC/DC converter has a dual-active bridge (DAB) topology, and
       wherein, upon shut down of a system powered by the DC/DC converter, energy from source is dissipated by:
           controlling a phase shift between the source-side bridge and the load-side bridge;
           discharging current from the source-side bridge across the transformer to the load-side bridge; and
           controlling switching on the load-side bridge to circulate current to prevent current from flowing to a load.

15. The DC/DC converter of claim 14, wherein the controlling of switching on the load-side bridge includes cycling switches on the load-side bridge on-and-off to circulate current from switch-to-switch.

16. The DC/DC converter of claim 15, wherein the circulated current does not reach the load.

17. The DC/DC converter of claim 15, wherein the switches on the load-side bridge are never on simultaneously.

18. The DC/DC converter of claim 14, wherein the controlling of the phase shift includes phase-shifting high-frequency square waves to facilitate the transferring of energy.

19. The DC/DC converter of claim 14, wherein controlling the phase shift between the source-side bridge and the load-side bridge includes controlling the phase shift to be in phase or out of phase.

* * * * *